United States Patent
Rondeau et al.

(10) Patent No.: US 9,546,108 B2
(45) Date of Patent: Jan. 17, 2017

(54) SUBSTRATE COATED WITH A STACK OF FUNCTIONAL LAYERS HAVING IMPROVED MECHANICAL PROPERTIES

(71) Applicant: SAINT-GOBAIN GLASS FRANCE, Courbevoie (FR)

(72) Inventors: Véronique Rondeau, Asnieres sur Seine (FR); Emilie Charlet, Paris (FR); Etienne Sandre-Chardonnal, Nantes (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/033,247

(22) PCT Filed: Nov. 5, 2014

(86) PCT No.: PCT/FR2014/052822
§ 371 (c)(1),
(2) Date: Apr. 29, 2016

(87) PCT Pub. No.: WO2015/067895
PCT Pub. Date: May 14, 2015

(65) Prior Publication Data
US 2016/0244361 A1 Aug. 25, 2016

(30) Foreign Application Priority Data
Nov. 8, 2013 (FR) .................................. 13 60970

(51) Int. Cl.
*B32B 15/04* (2006.01)
*B32B 17/06* (2006.01)
*C03C 17/36* (2006.01)

(52) U.S. Cl.
CPC ........... *C03C 17/3613* (2013.01); *C03C 17/36* (2013.01); *C03C 17/366* (2013.01); *C03C 17/3618* (2013.01); *C03C 17/3626* (2013.01); *C03C 17/3636* (2013.01); *C03C 17/3639* (2013.01); *C03C 17/3644* (2013.01); *C03C 17/3649* (2013.01); *C03C 17/3652* (2013.01)

(58) Field of Classification Search
USPC ....... 428/426, 428, 432, 433, 434, 688, 689, 428/697, 698, 699, 701, 702
See application file for complete search history.

(56) References Cited

U.S. PATENT DOCUMENTS

| | | | | |
|---|---|---|---|---|
| 5,935,702 A * | 8/1999 | Macquart | .......... | B32B 17/10174 359/359 |
| 6,322,881 B1 * | 11/2001 | Boire | .......... | C03C 17/36 204/192.23 |
| 6,680,134 B2 * | 1/2004 | Maurer | .......... | C03C 17/36 359/359 |
| 7,211,328 B2 * | 5/2007 | Schicht | .......... | C03C 17/36 428/432 |
| 7,935,423 B2 * | 5/2011 | Belliot | .......... | C03C 17/3435 428/213 |
| 2004/0241406 A1 * | 12/2004 | Nadaud | .......... | B32B 17/10036 428/212 |
| 2005/0123772 A1 * | 6/2005 | Coustet | .......... | C03C 17/36 428/432 |
| 2009/0136765 A1 * | 5/2009 | Maschwitz | ....... | B32B 17/10036 428/432 |

FOREIGN PATENT DOCUMENTS

| | | |
|---|---|---|
| EP | 0 131 523 A2 | 1/1985 |
| EP | 0 132 198 A1 | 1/1985 |
| EP | 0 389 354 A1 | 9/1990 |
| EP | 0 616 883 A2 | 9/1994 |
| EP | 0 638 528 A1 | 2/1995 |
| EP | 0 644 164 A1 | 3/1995 |
| EP | 0 722 427 A1 | 7/1996 |
| EP | 0 847 965 A1 | 6/1998 |
| EP | 1 498 397 A1 | 1/2005 |
| WO | WO 96/00194 | 1/1996 |
| WO | WO 96/00394 | 1/1996 |
| WO | WO 02/48065 A1 | 6/2002 |
| WO | WO 2006/067102 A2 | 6/2006 |
| WO | WO 2012/020189 A1 | 2/2012 |

OTHER PUBLICATIONS

International Search Report as issued in International Patent Application No. PCT/FR2014/052822, dated Feb. 2, 2015.
International Preliminary Report on Patentability and the Written Opinion of the International Searching Authority as issued in International Patent Application No. PCT/FR2014/052822, dated May 10, 2016.

* cited by examiner

*Primary Examiner* — Lauren R Colgan
(74) *Attorney, Agent, or Firm* — Pillsbury Winthrop Shaw Pittman LLP

(57) ABSTRACT

A transparent substrate provided with a stack of thin layers includes an alternation of n functional layers having reflection properties in the infrared region and/or in solar radiation with n≥2 and of n+1 coatings including one or more dielectric layers, so that each functional layer is positioned between two coatings, the coatings and the functional layers are numbered according to their position with respect to the transparent substrate, the lower coating 1 is placed above the transparent substrate and below the functional layer 1, the intermediate coatings 2 to n are placed between two functional layers and the upper coating n+1 is placed above the functional layer n, wherein at least one of the upper or intermediate coatings 2 to n+1 includes at least one barrier coating including at least two barrier layers, one layer including silicon and one layer based on aluminum nitride.

22 Claims, No Drawings

SUBSTRATE COATED WITH A STACK OF FUNCTIONAL LAYERS HAVING IMPROVED MECHANICAL PROPERTIES

CROSS-REFERENCE TO RELATED APPLICATIONS

This application is the U.S. National Stage of PCT/FR2014/052822, filed Nov. 5, 2014, which in turn claims priority to French Application No. 1360970, filed Nov. 8, 2013. The contents of all of these applications are incorporated herein by reference in their entirety.

The invention relates to a transparent substrate coated with a stack of thin layers comprising at least one functional layer which can influence solar radiation and/or infrared radiation. The invention also relates to glazings comprising these substrates and to the use of such substrates for manufacturing thermal insulation glazings and/or solar protection glazings.

These glazings are intended to equip both buildings and vehicles, for the purpose in particular of reducing the air conditioning strain and/or of reducing excessive overheating brought about by the ever-increasing size of glazed surfaces in dwellings.

Glazings comprising transparent substrates coated with a stack of thin layers comprising at least two functional metal layers positioned between three coatings made of dielectric material exhibiting the desired properties are known. These stacks are generally obtained by a sequence of depositions carried out by a technique which uses a vacuum, such as cathode sputtering, optionally assisted by a magnetic field.

There is currently an increasing demand for these solar protection glazings to also exhibit characteristics inherent in the substrates themselves, in particular esthetic characteristics (for them to be able to be rounded), mechanical characteristics (for them to be more resistant) or safety characteristics (for them not to injure in the event of breakage). This requires subjecting the substrates, preferably glass substrates, to heat treatments of the bending, annealing or tempering type. The stack of layers must thus be optimized in order to retain its integrity and in particular to prevent it from detrimentally changing during these transformation operations.

One solution developed in the applications EP 0 847 965 and WO 02/48065 consists in using stacks having two layers of silver which can be subjected to a heat treatment of the bending or tempering type without significant optical change, by virtue of the use of barrier layers of the silicon nitride type and of stabilizing layers.

These glazings have insufficient mechanical properties. Scratches very often appear on the stack. However, in particular, once these scratches are created on the glazing, their visibility greatly increases when the glazing is subjected to a heat treatment of tempering type. This phenomenon appears in part to be related to the dewetting of the material making up the functional layer at the scratch. The susceptibility to scratching of such glazings is prejudicial in terms of esthetic qualities and of production output. This can result in an abnormally high reject rate, very particularly in the case where these glazings are bent/tempered glazings, of or not of laminated type.

The objective of the invention is to develop a substrate coated with a stack having functional layers which can be subjected to washing operations or to high-temperature heat treatments of the bending, tempering or annealing type while retaining the quality of the stack and in particular while minimizing its ability to be scratched after heat treatment.

A subject matter of the invention is a transparent substrate provided with a stack of thin layers comprising an alternation of n functional layers having reflection properties in the infrared region and/or in solar radiation with $n \geq 2$ and of n+1 coatings comprising one or more dielectric layers, so that each functional layer is positioned between two coatings, the coatings and the functional layers are numbered according to their position with respect to the transparent substrate, the lower coating 1 is placed above the transparent substrate and below the functional layer 1, the intermediate coatings 2 to n are placed between two functional layers and the upper coating n+1 is placed above the functional layer n, characterized in that at least one of the upper or intermediate coatings 2 to n+1, preferably intermediate coatings 2 to n, comprises at least one barrier coating comprising at least two barrier layers, one layer comprising silicon and one layer based on aluminum nitride.

Throughout the description, the substrate according to the invention is regarded as being placed horizontally. The stack of thin layers is deposited above the substrate. The meaning of the expressions "above" and "below" and "lower" and "upper" is to be considered with respect to this orientation. If not specifically stipulated, the expressions "above" and "below" do not necessarily mean that two layers and/or coatings are positioned in contact with one another.

The lower coating 1 comprises one or more dielectric layers and is located above the substrate. The functional layer 1 is then located above the lower coating 1 and below the intermediate coating 2 comprising one or more dielectric layers. Finally, the last functional layer n is located above the intermediate coating n and below the upper coating n+1 comprising one or more dielectric layers.

The use of the terms "lower" and "upper", in order for example to describe some of the layers of the coatings 1 to n+1, also refers to the positioning defined above. This means that an upper layer corresponds to a layer located above one or more other layers. Likewise, a lower layer corresponds to a layer located below one or more other layers.

According to the invention, the coatings can be composed of several layers. The upper, intermediate or lower coatings used according to the invention do not comprise infrared-reflecting layers but can comprise absorbing layers.

According to the invention, a thin layer is a layer with a thickness of less than 1 μm.

The presence of a specific barrier coating located in an intermediate or upper coating and at a specific position of the stack makes it possible to obtain a substrate exhibiting a lower ability to be scratched but in particular a decrease in the display of scratches or defects subsequent to a heat treatment of tempering type, which is reflected in particular by a non-accentuation of their visibility. The mechanical properties of the stack and the resistance to transformations, such as washing, transportation and heat treatments of tempering type, are thus improved.

When the stack is heated to high temperature, in particular in the range of temperatures necessary for the normal operations of bending and/or tempering of glazings (approximately 550 to 750° C.), the materials which constitute the thin layers and the substrate react differently to this thermal stress. The functional metal layer will in particular greatly expand, generally more than the other layers of the stack, in particular the dielectric layers, which are contiguous to it. The functional layers will thus be in a state of compression at high temperature. Likewise, the glass substrate also greatly expands. This creates tensions within the stack and, in particular when scratches already exist, an increase in said scratches.

The applicant has discovered that the use of a barrier coating comprising the combination of a layer comprising silicon and of a layer based on aluminum nitride in a specific position of the stack makes it possible to reduce the level of stress and thus to improve the mechanical properties of the stack. It appears that the presence of this barrier coating comprising two layers exhibiting different compressive stresses and different thermal expansion coefficients located in a coating, preferably an intermediate (2 to n) coating, makes possible the relaxing of the stresses of the assembly formed by the glass substrate coated with the stack. The presence of this barrier coating makes it possible to relieve the thermomechanical stresses to which the assembly of the stack is subjected without modifying the other properties of these substrates.

The substrate can be made of any material capable of withstanding the high temperatures of the heat treatment. The transparent substrates can in particular be organic or inorganic and rigid or flexible substrates, in particular made of rigid inorganic material, such as glass, or rigid organic material, such as a polymer substrate. The transparent substrate is preferably made of glass, in particular soda-lime-silica glass.

Preferably, the stack comprises two functional layers alternating with three upper, intermediate and lower coatings (case where n=2).

The functional layer or layers having reflecting properties in the infrared region and/or in solar radiation are metal layers, preferably based on silver or on silver-containing metal alloy. The different functional layers of the stack can have identical or different thicknesses. The patent EP 0 638 528 describes, for example, a stack comprising two silver layers having different thicknesses.

The upper, intermediate and lower coatings 1 to n+1 can comprise one or more dielectric layers exhibiting varied functionalities. Mention may in particular be made, as constituent layers and coatings of the upper, intermediate or lower coatings, of barrier coatings, blocking layers, such as sacrificial or coupling layers, stabilizing layers and absorbing layers.

The upper, intermediate or lower coatings have a geometric thickness of at least 20 nm and which can range up to 120 nm. Preferably, the lower and upper coatings have a thickness of between 15 and 60 nm, between 20 and 50 nm or else between 20 and 40 nm. Preferably, the intermediate coatings have a thickness of between 50 and 100 nm, between 60 and 90 nm or else between 65 and 85 nm.

According to the invention, a barrier coating comprises at least one barrier layer. A barrier layer is a layer made of a material capable of forming a barrier to the diffusion of oxygen and water at high temperature, originating from the ambient atmosphere or from the transparent substrate, toward the functional layer. The constituent materials of the barrier layer thus must not undergo chemical or structural modification at high temperature which would result in a modification to their optical properties. The barrier layer or layers are preferably also chosen made of a material capable of forming a barrier to the constituent material of the functional layer. The barrier layers thus make it possible for the stack to be subjected, without excessively significant optical change, to heat treatments of the annealing, tempering or bending type.

The barrier layers can be layers comprising silicon chosen from oxides, such as $SiO_2$, nitrides $Si_3N_4$ and oxynitrides $SiO_xN_y$. The barrier layers can also be based on aluminum nitrides AlN.

When nitride, for example aluminum nitride or silicon nitride, layers are used, attempts are made to obtain a stable stoichiometry in order to obtain the required optical properties, in particular of transparency. However, such a stable stoichiometry is not necessarily achieved depending on the deposition conditions. The nitride layers can be stoichiometric, sub-stoichiometric or super-stoichiometric in nitrogen. It is possible to adjust the stoichiometry, in particular by varying the percentage of nitrogen in the sputtering chamber when the layer is deposited by reactive cathode sputtering starting from a metal target.

Preferably, each upper, intermediate or lower coating comprises a barrier coating comprising at least one barrier layer comprising silicon and more preferably still based on silicon nitride.

Silicon and/or aluminum nitrides are known for their high chemical inertia, even at high temperature. The layers based on these materials act as dielectrics having an optical function, having a function of protecting the silver layers and optionally, when they are placed in contact with an absorbing layer, having a function of screening layers.

Each lower, intermediate or upper coating can comprise at least one barrier coating comprising at least one barrier layer. The barrier coatings are preferably located above each functional layer and above the transparent substrate. Preferably, the stack can comprise at least one barrier coating above and below each functional layer.

The geometric thickness of a barrier coating is at least 10 nm, in particular at least 15 nm, and can range up to 120 nm. When the barrier coating is composed of a single barrier layer, these thicknesses correspond to the thickness of the single barrier layer.

Each of the barrier layers of a barrier coating has a thickness of at least 5 nm.

The thickness of a barrier coating can depend on its place in the stack. For example:
when the coating is a lower coating, the thickness of the barrier coating can be between 15 and 60 nm, between 20 and 50 nm or else between 25 and 35 nm,
when the coating is an intermediate (2 to n) coating, the thickness of the barrier coating can be between 50 and 100 nm, between 60 and 90 nm or else between 65 and 85 nm,
when the coating is an upper coating, the thickness of the barrier coating can be between 10 and 40 nm, between 10 and 30 nm or else between 10 and 20 nm.

A barrier coating comprising at least two layers, one layer comprising silicon and one layer based on aluminum nitride, also satisfies the thickness criteria given above. For example, when the barrier coating is composed of two layers, the layer based on aluminum nitride and the layer comprising silicon each have a thickness of at least 5 nm, in particular of at least 7 nm, in particular between 7 and 30 nm or else between 10 and 20 nm.

Advantageously, the total thickness of the layer or layers of aluminum nitride present in an intermediate or upper coating can vary from 10 nm to half the thickness of the intermediate or upper coating in which it is located. The thickness of all the layers of aluminum nitride included in an intermediate or upper coating represents from 20 to 80%, preferably from 30 to 60%, of the total thickness of said intermediate or upper coating.

The stoichiometry of the layer of aluminum nitride can also vary. This is because this layer of aluminum nitride can comprise one or more metals or semimetals (metalloids) other than aluminum. The presence and the proportions of this or these other metals or semimetals (metalloids) are chosen so that the properties of the stack are not modified. The ratio of the aluminum to all the other metals or semimetals (metalloids), as atomic percentage, in the layers of aluminum nitrides is greater than 1. Advantageously, this ratio, as atomic percentage, between the aluminum and all the other metals or semimetals (metalloids) of the layers of aluminum nitride is, by increasing order of preference, greater than 1.5, greater than 3, greater than 4, greater than 9, greater than 15, greater than 20, greater than 50 or greater than 100.

By way of example, the layer of aluminum nitride can in particular comprise silicon with a ratio of the aluminum to the silicon, as atomic percentage, in the layer of greater than 1.

According to one embodiment, the layer of aluminum nitride does not contain metals or semimetals (metalloids) other than aluminum.

According to advantageous embodiments of the invention, the stack can satisfy one or more of the following characteristics:
- the barrier coating or coatings of the lower coating 1 are composed of silicon nitride, which means that these barrier coatings and thus the lower coating 1 do not comprise a layer of aluminum nitride,
- the barrier coating or coatings of the upper coating n+1 are composed of silicon nitride, which means that these barrier coatings and thus the upper coating n+1 do not comprise a layer of aluminum nitride,
- the barrier coating comprising at least two barrier layers, one layer comprising silicon and one layer based on aluminum nitride, comprises three barrier layers, two layers comprising silicon above and below a layer based on aluminum nitride,
- the barrier coating comprising at least two barrier layers, one layer comprising silicon and one layer based on aluminum nitride, comprises four barrier layers, two layers comprising silicon and two layers based on aluminum nitride,
- the layer based on aluminum nitride is located between a functional layer and the layer comprising silicon of the barrier layer comprising at least two layers,
- the layer based on aluminum nitride is found between two dielectric layers, at least one of which is based on a silicon nitride and the other on zinc oxide.

Preferably, the barrier coating comprising at least two layers, one layer comprising silicon and one layer based on aluminum nitride, is located in the intermediate coating n, that is to say in the penultimate coating. In this intermediate coating n, the layer based on aluminum nitride is located above the functional layer n−1 and below the layer comprising silicon of the barrier coating comprising at least two layers.

The stack of the invention can also comprise at least one blocking layer.

Preferably, the blocking layers are directly in contact with a functional layer. A blocking layer located above a functional layer is known as blocking overlayer. A blocking layer located below a functional layer is known as blocking underlayer.

The blocking layers can comprise a thin layer of metal or of sub-stoichiometric metal oxide which is optionally nitrided. Mention may be made, as blocking layer suitable according to the invention, of a layer of a metal or of a metal oxide or suboxide based on titanium, niobium or nickel-chromium alloy. The metal layers are optionally partially oxidized.

Preferably, the blocking layers have a thickness of less than 5 nm, preferably of less than 3 nm and better still of between 0.5 and 2 nm.

In the preferred embodiment of the invention, at least one, preferably each, functional layer is surmounted by a blocking layer. The sacrificial layer preferably has a thickness of less than 2 nm.

The stack according to the invention or at least one coating comprises at least one stabilizing layer. Within the meaning of the invention, "stabilizing" means that the nature of the layer is selected so as to stabilize the interface between the functional layer and this layer. This stabilization results in reinforcing the adhesion of the functional layer to the layers which surround it and in fact it will oppose the migration of its constituent material.

The stabilizing layer is preferably a layer based on oxide chosen from zinc oxide, tin oxide, zirconium oxide or a mixture of at least two among them.

The stabilizing layer or layers are preferably layers of zinc oxide. This is because it is advantageous to have a layer based on zinc oxide below a functional layer as it facilitates the adhesion and the crystallization of the silver-based functional layer and enhances its quality and its stability at high temperature. It is also advantageous to have a layer based on zinc oxide above a functional layer in order to increase the adhesion thereof and to optimally oppose the diffusion on the side of the stack opposite the substrate.

The stabilizing layer or layers can thus be found above and/or below at least one functional layer or each functional layer, either directly in contact with it or separated by a blocking layer. Preferably, each functional layer is above a coating, the upper layer of which is a stabilizing layer, preferably based on zinc oxide, and/or below a coating, the lower layer of which is a stabilizing layer.

Advantageously, each barrier layer is separated from a functional layer by at least one stabilizing layer.

This stabilizing layer can have a thickness of at least 5 nm, in particular a thickness of between 5 and 25 nm and better still from 8 to 15 nm.

In the case where the stack thus uses several functional layers, it is advantageous for the final functional layer, the one most distant from the substrate coated with the stack, to be provided both with a barrier coating and with a stabilizing layer. This final functional layer is the most "exposed" due to its position in the stack, in the sense that it was the most susceptible to being oxidized by the ambient atmosphere. Furthermore, this final functional layer (n) is that for which a portion of its constituent material can most easily migrate up to the external surface of the final layer of the stack.

It is possible, of course, to plan for all of the functional layers to be thus provided with a barrier coating, with a stabilizing layer and optionally with a sacrificial and/or coupling layer.

The stack according to the invention or at least a lower, upper or intermediate coating can additionally comprise at least one absorbing layer. Such a layer makes it possible to adjust the level of light transmission of the glazing within a certain range, without, however, having to completely reconfigure the stack of thin layers. The layer or layers which absorb in the visible region can be inserted between two layers of dielectric material and separated from the silver layer or layers by said dielectric layers.

The absorbing layer or layers can comprise a metal, a metal alloy, a metal oxide or a metal nitride. The metal can be chosen from titanium Ti, niobium Nb or zirconium Zr and the metal alloys among alloys of nickel and chromium NiCr. The metal oxides can be chosen from chromium oxide, iron oxide or a sub-stoichiometric oxide of titanium or zinc. The metal nitrides can be chosen from titanium nitride, niobium nitride, zirconium nitride, chromium nitride or a nickel-chromium nitride.

According to an embodiment according to which the stack comprises two silver-based functional layers between three lower, intermediate and upper coatings, the absorbing layer or layers are inserted into the intermediate coating positioned between the two functional layers and/or into the upper coating positioned above the second functional layer.

According to a preferred embodiment of the invention, the absorbing layer is found between two dielectric layers, at least one of which belongs to a barrier coating. At least one of the two layers between which the absorbing layer is inserted can thus be a barrier layer.

In an alternative form, the absorbing layer or layers can be inserted into a barrier coating between two barrier layers of a lower, intermediate or upper coating, preferably an intermediate coating.

The thickness of each of the layers which absorb in the visible region is, by increasing order of preference, less than or equal to 7 nm, less than or equal to 5 nm, less than or equal to 3 nm, less than or equal to 2 nm or between 0.5 and 2 nm.

The absorbing layers have an intrinsic light absorption of at least 3%, in particular of between 4 and 15% or between 6 and 12%.

It is advantageous to note that some materials suitable for the sacrificial layers are also suitable as absorbing layers. According to an embodiment, one of the sacrificial layers also acts as absorbing layer. The layer which is simultaneously absorbing and sacrificial can be essentially metallic, in particular made of a material chosen from at least one of the following metals: Ni, Cr, Nb, Sn or Ti, an alloy such as NiCr or steel. In this case, its thickness is preferably from 2 to 5 nm.

The absorbing layer can be found in the intermediate and/or upper coating comprising the barrier coating comprising a layer comprising silicon and a layer based on aluminum nitride. The absorbing layer is preferably directly in contact with two barrier layers. The absorbing layer is preferably directly in contact with two layers comprising silicon.

The barrier coating comprising in particular a layer of aluminum nitride and the absorbing layer can be inserted into the "intermediate" coating n, that is to say into a coating positioned between two functional layers.

Finally, the stack of the invention preferably comprises a protective overlayer. This protective overlayer is thus the upper layer of the coating n+1. Preferably, the coating n+1 comprises, as upper layer, a layer based on SnZnO or $TiO_2$. Its thickness is preferably chosen between 0.5 and 20 nm, in particular between 1 and 5 nm.

According to an advantageous embodiment, the transparent substrate comprises a stack, defined starting from the transparent substrate, comprising:
  at least one barrier coating,
  at least one stabilizing layer,
  at least one functional layer,
  optionally a blocking layer,
  at least one stabilizing layer,
  at least one barrier coating,
  at least one stabilizing layer,
  at least one functional layer,
  optionally a blocking layer,
  at least one stabilizing layer,
  at least one barrier coating.

According to another embodiment, the transparent substrate comprises a stack, defined starting from the transparent substrate, comprising:
  at least one barrier coating,
  at least one stabilizing layer,
  at least one functional layer,
  optionally a blocking layer,
  at least one stabilizing layer,
  at least one barrier coating into which at least one absorbing layer is inserted,
  at least one stabilizing layer,
  at least one functional layer,
  optionally a blocking layer,
  at least one stabilizing layer,
  at least one barrier coating.

These stacks, defined starting from the transparent substrate, can in particular be chosen from:
  $Si_3N_4$/ZnO/Ag/ZnO/AlN/$Si_3N_4$/ZnO/Ag/ZnO/$Si_3N_4$)
  $Si_3N_4$/ZnO/Ag/ZnO/$Si_3N_4$/AlN/ZnO/Ag/ZnO/$Si_3N_4$,
  $Si_3N_4$/ZnO/Ag/NiCr/ZnO/AlN/$Si_3N_4$/ZnO/Ag/NiCr/ZnO/$Si_3N_4$,
  $Si_3N_4$/ZnO/Ag/NiCr/ZnO/$Si_3N_4$/AlN/ZnO/Ag/NiCr/ZnO/$Si_3N_4$,
  $Si_3N_4$/ZnO/Ag/ZnO/AlN/$Si_3N_4$/TiN or NbN or NiCrN/$Si_3N_4$/ZnO/Ag/ZnO/$Si_3N_4$,
  $Si_3N_4$/ZnO/Ag/NiCr/ZnO/AlN/$Si_3N_4$/TiN or NbN or NiCrN/$Si_3N_4$/ZnO/Ag/NiCr/ZnO/$Si_3N_4$,
  $Si_3N_4$/ZnO/Ag/ZnO/$Si_3N_4$/TiN or NbN or NiCrN/$Si_3N_4$/AlN/ZnO/Ag/ZnO/$Si_3N_4$,
  $Si_3N_4$/ZnO/Ag/NiCr/ZnO/$Si_3N_4$/TiN or NbN or NiCrN/$Si_3N_4$/AlN/ZnO/Ag/NiCr/ZnO/$Si_3N_4$,
  $Si_3N_4$/ZnO/Ag/ZnO/$Si_3N_4$/TiN or NbN or NiCrN/$Si_3N_4$/ZnO/Ag/ZnO/AlN/$Si_3N_4$,
  $Si_3N_4$/ZnO/Ag/NiCr/ZnO/$Si_3N_4$/TiN or NbN or NiCrN/$Si_3N_4$/ZnO/Ag/NiCr/ZnO/AlN/$Si_3N_4$,
  $Si_3N_4$/ZnO/Ag/ZnO/AlN/$Si_3N_4$/AlN/$Si_3N_4$/ZnO/Ag/ZnO/$Si_3N_4$,
  $Si_3N_4$/ZnO/Ag/ZnO/$Si_3N_4$/AlN/$Si_3N_4$/AlN/ZnO/Ag/ZnO/$Si_3N_4$,
  $Si_3N_4$/ZnO/Ag/NiCr/ZnO/AlN/$Si_3N_4$/AlN/$Si_3N_4$/ZnO/Ag/NiCr/ZnO/$Si_3N_4$,
  $Si_3N_4$/ZnO/Ag/NiCr/ZnO/$Si_3N_4$/AlN/$Si_3N_4$/AlN/ZnO/Ag/NiCr/ZnO/$Si_3N_4$,
  $Si_3N_4$/ZnO/Ag/ZnO/AlN/$Si_3N_4$/AlN/$Si_3N_4$/TiN or NbN or NiCrN/$Si_3N_4$/ZnO/Ag/ZnO/$Si_3N_4$,
  $Si_3N_4$/ZnO/Ag/NiCr/ZnO/AlN/$Si_3N_4$/AlN/$Si_3N_4$/TiN or NbN or NiCrN/$Si_3N_4$/ZnO/Ag/NiCr/ZnO/$Si_3N_4$,
  $Si_3N_4$/ZnO/Ag/ZnO/$Si_3N_4$/TiN or NbN or NiCrN/$Si_3N_4$/AlN/$Si_3N_4$/AlN/ZnO/Ag/ZnO/$Si_3N_4$,
  $Si_3N_4$/ZnO/Ag/NiCr/ZnO/$Si_3N_4$/TiN or NbN or NiCrN/$Si_3N_4$/AlN/$Si_3N_4$/AlN/ZnO/Ag/NiCr/ZnO/$Si_3N_4$,
  $Si_3N_4$/ZnO/Ag/ZnO/$Si_3N_4$/TiN or NbN or NiCrN/$Si_3N_4$/ZnO/Ag/ZnO/AlN/$Si_3N_4$/AlN/$Si_3N_4$,
  $Si_3N_4$/ZnO/Ag/NiCr/ZnO/$Si_3N_4$/TiN or NbN or NiCrN/$Si_3N_4$/ZnO/Ag/NiCr/AlN/$Si_3N_4$/AlN/$Si_3N_4$/ZnO,
  $Si_3N_4$/ZnO/Ag/ZnO/$Si_3N_4$/AlN/$Si_3N_4$/ZnO/Ag/ZnO/$Si_3N_4$,
  $Si_3N_4$/ZnO/Ag/ZnO/$Si_3N_4$/AlN/$Si_3N_4$/ZnO/Ag/ZnO/$Si_3N_4$,
  $Si_3N_4$/ZnO/Ag/NiCr/ZnO/$Si_3N_4$/AlN/$Si_3N_4$/ZnO/Ag/NiCr/ZnO/$Si_3N_4$, $Si_3N_4/ZnO/Ag/NiCr/ZnO/Si_3N_4/AlN/Si_3N_4/ZnO/Ag/$
$NiCr/ZnO/Si_3N_4$, $Si_3N_4/ZnO/Ag/ZnO/Si_3N_4/AlN/Si_3N_4/TiN$ or NbN or $NiCrN/Si_3N_4/ZnO/Ag/ZnO/Si_3N_4$, $Si_3N_4/ZnO/Ag/NiCr/ZnO/Si_3N_4/AlN/Si_3N_4/TiN$ or NbN or $NiCrN/Si_3N_4/ZnO/Ag/NiCr/ZnO/Si_3N_4$, $Si_3N_4/ZnO/Ag/ZnO/Si_3N_4/TiN$ or NbN or $NiCrN/Si_3N_4/AlN/Si_3N_4/ZnO/Ag/ZnO/Si_3N_4$, $Si_3N_4/ZnO/Ag/NiCr/ZnO/Si_3N_4/TiN$ or NbN or $NiCrN/Si_3N_4/AlN/Si_3N_4/ZnO/Ag/NiCr/ZnO/Si_3N_4$, $Si_3N_4/ZnO/Ag/ZnO/Si_3N_4/TiN$ or NbN or $NiCrN/Si_3N_4/ZnO/Ag/ZnO/Si_3N_4/AlN/Si_3N_4$, $Si_3N_4/ZnO/Ag/NiCr/ZnO/Si_3N_4/TiN$ or NbN or $NiCrN/Si_3N_4/ZnO/Ag/NiCr/ZnO/Si_3N_4/AlN/Si_3N_4$.

The glazing of the invention comprises the substrate carrying the stack. This glazing can additionally comprise other substrates. These substrates can be clear or colored; in particular, at least one of the substrates can be made of glass colored in its body. The choice of the type of coloring will depend on the level of light transmission and/or on the colorimetric appearance desired for the glazing once the manufacture thereof is complete.

The substrates can be glasses sold under the Parsol® name by Saint-Gobain, in particular those having a grayish-green tint. They can also be glasses, the composition and the properties of which are described in particular in the patents EP 0 616 883, EP 0 644 164, EP 0 722 427 and WO 96/00394.

The invention relates to all glazings provided with these substrates, such as laminated glazings, "asymmetric" laminated glazings or multiple glazings of the double glazing type.

The glazings exhibiting a laminated structure comprise at least two rigid substrates of the glass type rendered integral by at least one sheet of thermoplastic polymer, in order to exhibit a structure of glass/stack of thin layers/sheet(s)/glass type. The polymer can in particular be based on polyvinyl butyral PVB, ethylene-vinyl acetate EVA, polyethylene terephthalate PET or polyvinyl chloride PVC. The stack is deposited on one of the rigid substrates or on a polymer sheet which will be assembled with the two rigid substrates by thermoplastic sheets.

The glazing can also exhibit an "asymmetric" laminated glazing structure comprising a rigid substrate of glass type and at least one polymer sheet of polyurethane type having energy-absorbing properties, optionally in combination with another layer of polymers. For further details with regard to this type of glazing, reference may in particular be made to the patents EP 0 132 198, EP 0 131 523 and EP 0 389 354. The glazing can then exhibit a structure of glass/stack of thin layers/polymer sheet(s) type.

The glazings according to the invention are capable of being subjected to a heat treatment without damage to the stack of thin layers. They are thus optionally bent and/or tempered. In the case where they are bent, in particular for the purpose of forming glazings for vehicles, the stack of thin layers is preferably found on an at least partially nonplanar face. In a laminated structure, it is preferably in contact with the polymer sheet.

The glazing can also be bent and/or tempered while being composed of a single substrate, that provided with the stack. "Monolithic" glazing is then referred to. The glazing can also be a multiple glazing, in particular a double glazing, at least the substrate carrying the stack being bent and/or tempered. It is preferable in a multiple glazing configuration for the stack to be positioned so as to face the inserted gas-filled cavity.

In the case of a glazing of double glazing type, the stack is preferably on face 2 or on face 3 of the glazing (the faces of the substrates being conventionally numbered from the outermost face to the inner face of the glazing once fitted in a building).

The invention relates to glazings which exhibit:
light transmissions LT of 5 to 80%, in particular of 40 to 60%, and/or
an external light reflection R of 10 to 30%, and/or
values of a* and b* in external light reflection of less than or equal to 1, preferable negative values (even after having undergone heat treatments of the tempering type), more particularly in the case of stacks comprising two silver layers.

Finally, the glazing comprising a substrate provided with the stack according to the invention can also be provided with at least one other coating having a different function, in particular an antisoiling coating, a hydrophobic coating, a hydrophilic coating or an antireflective coating. They can comprise, for example, an antisoiling coating based on photocatalytic $TiO_2$, a hydrophobic coating based on fluoropolymer, a hydrophilic coating based on $SiO_2$ or SiOC and one or more antireflective coatings. These coatings are preferably positioned on at least one of the external faces of the glazings (the faces facing the outside, in contrast to the faces facing the internal thermoplastic sheet in the case of a laminate or the faces facing the air-filled, gas-filled or vacuum-filled cavity in the case of an insulating glazing).

The invention also relates to the process for the manufacture of the substrate, which consists in depositing the stack of thin layers on its substrate, preferably made of glass. The deposition can be carried out by a vacuum technique of the cathode sputtering type, optionally assisted by a magnetic field (without excluding the first layer or layers being able to be deposited by another technique, for example by a thermal decomposition technique of pyrolysis type). In addition, the process can comprise a heat treatment of the bending/tempering or annealing type on the coated substrate.

The details and advantageous characteristics of the invention emerge from the following nonlimiting examples.

EXAMPLES

I. Description of the Glazings Tested

The stacks are deposited on substrates made of clear soda-lime-silica glass with a thickness of 4 mm.
In all the examples of the invention:
the functional layers are silver (Ag) layers,
the blocking layers are made of alloy of nickel and chromium (NiCr),
the stabilizing layers are made of zinc oxide (ZnO),
and absorbing layers are made of nickel-chromium nitride (NiCrN).

The stacks of the invention comprise at least one barrier coating comprising at least two barrier layers, one layer based on silicon nitride ($Si_3N_4$) and one layer based on aluminum nitride (AlN), at a specific position. Preferably, the two barrier layers comprising at least one layer based on silicon nitride ($Si_3N_4$) and one layer based on aluminum nitride (AlN) of the barrier coating are in direct contact.

The other barrier coatings of the stacks according to the invention, according to the reference example, can be composed solely of silicon nitride ($Si_3N_4$).

In these examples, the nature of the barrier coating and its position were varied.

The successive depositions of the layers of the stack are carried out by cathode sputtering assisted by a magnetic field. The deposition plant comprises at least one sputtering chamber provided with cathodes equipped with targets made of appropriate materials under which the substrate successively passes. The power densities, the rates of forward progression of the substrate, the pressure and the choice of the atmosphere are adjusted in a known way in order to obtain the desired layer thicknesses. The glazings tested comprise the stacks described in the table below.

| Positioning | | Ref. Ex. | Inv. 1 | Inv. 2 | Inv. 3 | Inv. 4 | Inv. 5 |
|---|---|---|---|---|---|---|---|
| Substrate | Glass | nm | nm | nm | nm | nm | nm |
| Lower coating 1 | $Si_3N_4$ | 30 | 30 | 30 | 30 | 30 | 30 |
| | ZnO | 6 | 6 | 6 | 6 | 6 | 6 |
| Functional layer 1 | Ag | 7 | 7 | 7 | 7 | 7 | 7 |
| | NiCr | 0.8 | 0.8 | 0.8 | 0.8 | 0.8 | 0.8 |
| Intermediate coating 2 | ZnO | 6 | 6 | 6 | 6 | 6 | 6 |
| | AlN | — | — | 20 | — | 20 | — |
| | $Si_3N_4$ | 34 | 34 | 14 | 34 | 48 | 48 |
| | $Si_{70}Al_{30}N$ | — | — | — | — | — | — |
| | NiCrN | 0.9 | 0.9 | 0.9 | 0.9 | — | — |
| | $Si_3N_4$ | 34 | 34 | 34 | 14 | — | — |
| | AlN | — | — | — | 20 | — | 20 |
| | ZnO | 6 | 6 | 6 | 6 | 6 | 6 |
| Functional layer 2 | Ag | 18 | 18 | 18 | 18 | 18 | 18 |
| | NiCr | 1 | 1 | 1 | 1 | 1 | 1 |
| Upper coating 3 | ZnO | 6 | 6 | 6 | 6 | 6 | 6 |
| | AlN | — | 8 | — | — | — | — |
| | $Si_3N_4$ | 16 | 8 | 16 | 16 | 16 | 16 |
| | SnZnO | 3 | 3 | 3 | 3 | 3 | 3 |

The character "-" means that the layer does not exist. The reference example does not comprise a layer based on aluminum nitride.

The example of the invention 1 comprises a barrier coating comprising a layer based on aluminum nitride in the upper coating 3 located above the final functional layer. In this embodiment, which is not preferred, the layer based on aluminum nitride is not included between two functional layers.

The examples of the invention 2, 3 and 5 comprise a barrier coating comprising a layer based on aluminum nitride in the intermediate coating 2 located between the two functional layers.

The glazings, once provided with the stack of layers, can be subjected to a heat treatment in order to simulate a tempering under the normal conditions in the field. The glazings are then subjected to a heat treatment for approximately 8 minutes at a temperature of approximately 650° C., followed by cooling in the ambient air (approximately 20° C.).

II. Erichsen Brush Test (EBT)

The different glazings comprising the substrates described above were subjected to the Erichsen Brush Test (EBT) for 100 or 300 cycles, before and after tempering. This test consists in rubbing the stack using a brush consisting of bristles made of polymer material, the stack being covered with water. A glazing is regarded as satisfying the test if no mark is visible to the naked eye.

The test before tempering gives a good indication with regard to the ability of the glazing to be scratched during a washing operation. The test after tempering gives a good indication with regard to the propagation of the cracks after heat treatment.

The following assessment indicators were used:
"+++": no scratch,
"++": 1 or 2 fine and noncontinuous scratches,
"+": a few fine and noncontinuous scratches,
"0": noncontinuous scratches,
"−": numerous fine scratches,
"−−": even more numerous fine scratches,
"−−−": highly scratched.

The glazings, the evaluation conditions and the assessment indicators are summarized in the table below.

| | Tempering | | | |
|---|---|---|---|---|
| | Before | | After | |
| Cycles | 100 | 300 | 100 | 300 |
| Reference | ++ | + | −− | −−− |
| Inv. 1 | ++ | + | 0 | − |
| Inv. 2 | +++ | +++ | +++ | ++ |
| Inv. 3 | +++ | +++ | +++ | +++ |

The stacks of the invention make it possible to sufficiently relax the compressive stresses and thus to eliminate the disadvantages related to the ability of such stacks to be scratched and to the propagation of said scratches subsequent to a heat treatment, this more particularly being the case when the barrier layer comprising aluminum nitride is located in the intermediate coating 2.

III. Erichsen Scratch Test

The different glazings comprising the substrates described above were subjected to the Erichsen Scratch Test (EST) after having been subjected to tempering under the conditions defined above. This test consists in recording the value of the force, in newtons, necessary in order to produce a scratch in the stack when the test is carried out (Van Laar tip, steel ball). The test was carried out at 0.5N. The width of the scratches (w) was measured in μm.

| Glazing | Width of the scratch before tempering | Width of the exploded scratch after tempering | % of corroded scratch |
|---|---|---|---|
| Reference | 15 | 40 | 50% |
| Inv. 1 | 17 | 60 | 55% |
| Inv. 2 | 12 | 15 | 10% |
| Inv. 3 | 15 | 30 | 20% |

A corroded and exploded (propagation of the corrosion into the regions adjacent to the scratch) scratch appears very visible in transmission and exhibits a bright yellow appearance. The stacks comprising the specific barrier coating of the invention located in the intermediate coating 2 show a less visible scratch after tempering. This is because the barrier coating prevents corrosion of the scratch and the propagation of this corrosion into the regions adjacent to the scratch (known as exploding). The visibility of the scratch is the same before and after tempering. This tendency is even more marked when the layer based on aluminum nitride is located above a stabilizing layer and below a layer of $Si_3N_4$.

These examples clearly show that the barrier coating comprising in particular a layer based on aluminum nitride has to be inserted in a specific fashion into stacks in order to limit the ability of said stacks to be scratched or, in the even of scratching, the visibility of said scratches.

The invention claimed is:

1. A transparent substrate provided with a stack of thin layers comprising an alternation of n functional layers having reflection properties in the infrared region and/or in solar radiation with n≥2 and of n+1 coatings comprising one or more dielectric layers, so that each functional layer is positioned between two coatings, the coatings and the functional layers are numbered according to their position with respect to the transparent substrate, a lower coating 1 is placed above the transparent substrate and below the functional layer 1, the intermediate coatings 2 to n are placed between two functional layers and an upper coating n+1 is placed above the functional layer n, wherein at least one of the upper or intermediate coatings 2 to n+1, comprises at least one barrier coating comprising at least two barrier layers, one layer of the at least two barrier layers comprising silicon and another one layer of the at least two barrier layers based on aluminum nitride, said one layer comprising silicon being in contact with said other layer based on aluminum nitride.

2. The transparent substrate as claimed in claim 1, wherein the stack comprises two functional layers alternating with three lower, intermediate and upper coatings.

3. The transparent substrate as claimed in claim 1, wherein the barrier coating comprising at least two layers comprises three layers, two layers comprising silicon located above and below a layer based on aluminum nitride.

4. The transparent substrate as claimed in claim 1, wherein the layer based on aluminum nitride is located between a functional layer and the layer comprising silicon.

5. The transparent substrate as claimed in claim 1, wherein the barrier coating comprising at least two layers, one layer comprising silicon and one layer based on aluminum nitride, is located in the intermediate coating n.

6. The transparent substrate as claimed in claim 5, wherein, in the intermediate coating n, the layer based on aluminum nitride is located above the functional layer n−1 and below a layer comprising silicon.

7. The transparent substrate as claimed in claim 1 wherein each lower, intermediate or upper coating comprises at least one barrier coating comprising at least one barrier layer.

8. The transparent substrate as claimed in claim 1, characterized in that wherein at least one functional layer is surmounted by a blocking layer.

9. The transparent substrate as claimed in claim 8, wherein each functional layer is surmounted by a blocking layer.

10. The transparent substrate as claimed in claim 1, wherein at least one lower, intermediate or upper coating comprises at least one stabilizing layer.

11. The transparent substrate as claimed in claim 10, wherein each functional layer is above a lower or intermediate coating, the upper layer of which is a stabilizing layer, and/or below an intermediate or upper coating, the lower layer of which is a stabilizing layer.

12. The transparent substrate as claimed in claim 11, wherein the stabilizing layer is based on zinc oxide.

13. The transparent substrate as claimed in claim 1, characterized in that wherein at least one lower, intermediate or upper coating comprises at least one absorbing layer.

14. The transparent substrate as claimed in claim 1, wherein the upper coating n+1 comprises, as upper layer, a layer based on SnZnO or $TiO_2$.

15. The transparent substrate as claimed in claim 14, wherein the layer based on SnZnO or $TiO_2$ has a thickness of less than 5 nm.

16. The transparent substrate as claimed in claim 1, wherein the layer of aluminum nitride comprises one or more metals or semimetals other than aluminum with a ratio of the aluminum to all the other metals or semimetals, as atomic percentage, in the layers of aluminum nitrides of greater than 1.

17. The transparent substrate as claimed in claim 16, wherein the ratio is greater than 9.

18. The transparent substrate as claimed in claim 1, wherein a total the thickness of the at least one layer based on aluminum nitride included in an intermediate or upper coating represents from 20 to 80% of the total thickness of said intermediate or upper coating.

19. The transparent substrate as claimed in claim 18, wherein the total thickness of the at least one layer based on aluminum nitride included in an intermediate or upper coating represents from 30 to 60% of the total thickness of said intermediate or upper coating.

20. The transparent substrate as claimed in claim 1, comprising a stack, defined starting from the transparent substrate, comprising:
   at least one barrier coating,
   at least one stabilizing layer,
   at least one functional layer,
   optionally a sacrificial layer,
   at least one stabilizing layer,
   at least one barrier coating into which at least one absorbing layer is optionally intercalated,
   at least one stabilizing layer,
   at least one functional layer,
   optionally a sacrificial layer,
   at least one stabilizing layer,
   at least one barrier coating.

21. A glazing comprising a transparent substrate as claimed in claim 1, wherein the glazing is in the form of a laminated glazing, of an asymmetric glazing or of a multiple glazing of the double glazing type.

22. The transparent substrate as claimed in claim 1, wherein at least one of the intermediate coatings 2 to n comprises at least one barrier coating comprising at least two barrier layers, one layer of the at least two barrier layers comprising silicon and another one layer of the at least two barrier layers based on aluminum nitride.

* * * * *